United States Patent [19]
Zambelli

[11] Patent Number: 6,027,070
[45] Date of Patent: Feb. 22, 2000

[54] AIRCRAFT LANDING GEAR MANUAL RELEASE ASSEMBLY

[75] Inventor: Robert G. Zambelli, Souderton, Pa.

[73] Assignee: Triumph Controls, Inc., North Wales, Pa.

[21] Appl. No.: 09/023,960

[22] Filed: Feb. 17, 1998

[51] Int. Cl.[7] .................................................. B64C 25/26
[52] U.S. Cl. .............................. 244/102 R; 244/102 SC; 74/501.5 R
[58] Field of Search ........................... 244/100 R, 102 R, 244/102 A, 102 SC, 102 S, 103 R, 225, 232; 74/471 R, 471 XY, 501 R, 501.5 R, 489

[56] References Cited

U.S. PATENT DOCUMENTS

| | | | |
|---|---|---|---|
| 2,242,125 | 5/1941 | Hineman | 244/102 R |
| 2,293,198 | 8/1942 | Filmer | 244/102 A |
| 2,445,602 | 7/1948 | Casaroll . | |
| 2,452,787 | 11/1948 | Patch | 244/102 R |
| 2,460,693 | 2/1949 | Hall . | |
| 2,461,378 | 2/1949 | Grose . | |
| 2,467,898 | 4/1949 | Longepierre | 244/102 R |
| 2,480,093 | 8/1949 | McMillan . | |
| 2,584,055 | 1/1952 | Smith . | |
| 2,801,817 | 8/1957 | Brader | 244/102 R |
| 3,083,587 | 4/1963 | Buddo . | |
| 3,355,960 | 12/1967 | Bureck et al. . | |
| 3,526,375 | 9/1970 | Stearman | 244/102 R |
| 3,652,039 | 3/1972 | Lucien | 244/102 A |
| 4,201,095 | 5/1980 | Cirami . | |
| 4,526,057 | 7/1985 | Mochida et al. . | |

*Primary Examiner*—Galen L. Barefoot
*Attorney, Agent, or Firm*—Howard & Howard

[57] ABSTRACT

The invention is illustrated by two embodiments of an aircraft landing gear manual release assembly each comprising a sequential main gear mechanism (MGM) for sequential release of port and starboard main door uplocks (MDU) followed by release of port and starboard main gear uplocks (MGU) and a sequential nose gear mechanism (NGM) for sequential release of a nose door uplock (NDU) followed by release of a nose gear uplock (NGU). The assemblies are characterized by a single control handle actuator (CHA) for movement from a gear stowed position to a gear deployed position for sequential actuation of the main gear mechanism (MGM) followed by actuation of the nose gear mechanism (NGM) through cable assemblies (20 or 120) and (22 or 122). The single control handle actuator (CHA) includes a single control handle (30 or 130) and a first support bracket (31 or 131) movably supporting the control handle (30 or 130) and a lost motion member (32 or 132) movably supported by the first support bracket (31 or 131). The control handle actuator (CHA) further includes a first lost motion connection (33 and 34 or 133 and 134) between the control handle (30 or 130) and the lost motion member (32 or 132) whereby the control handle (30 or 130) first moves the first cable assembly (20 or 120) and upon continued movement thereof moves the lost motion member (32 or 132) to subsequently move the second cable assembly (22 or 122) for the sequential actuation of the main gear mechanism (MGM) followed by actuation of the nose gear mechanism (NGM).

24 Claims, 10 Drawing Sheets

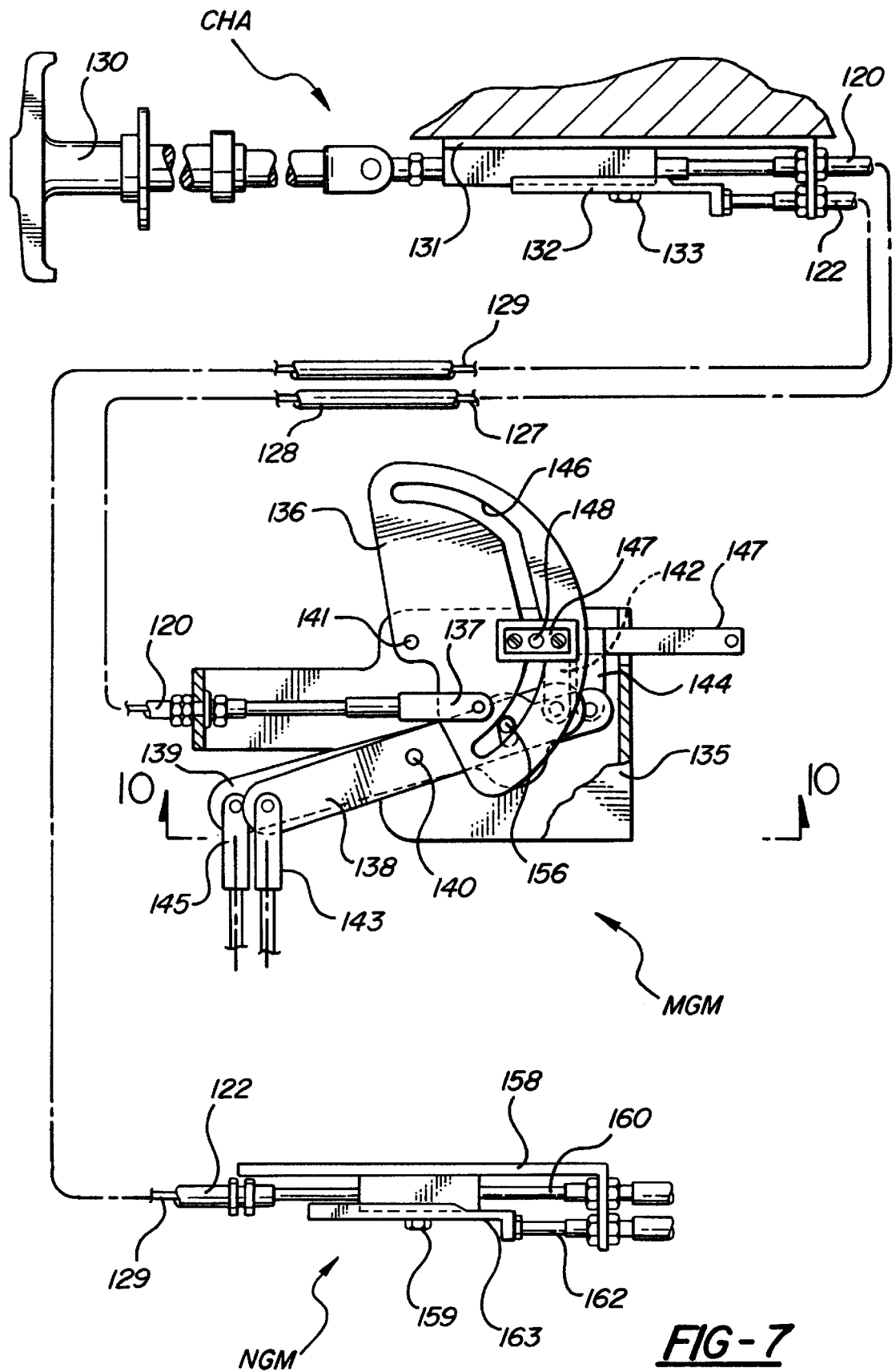

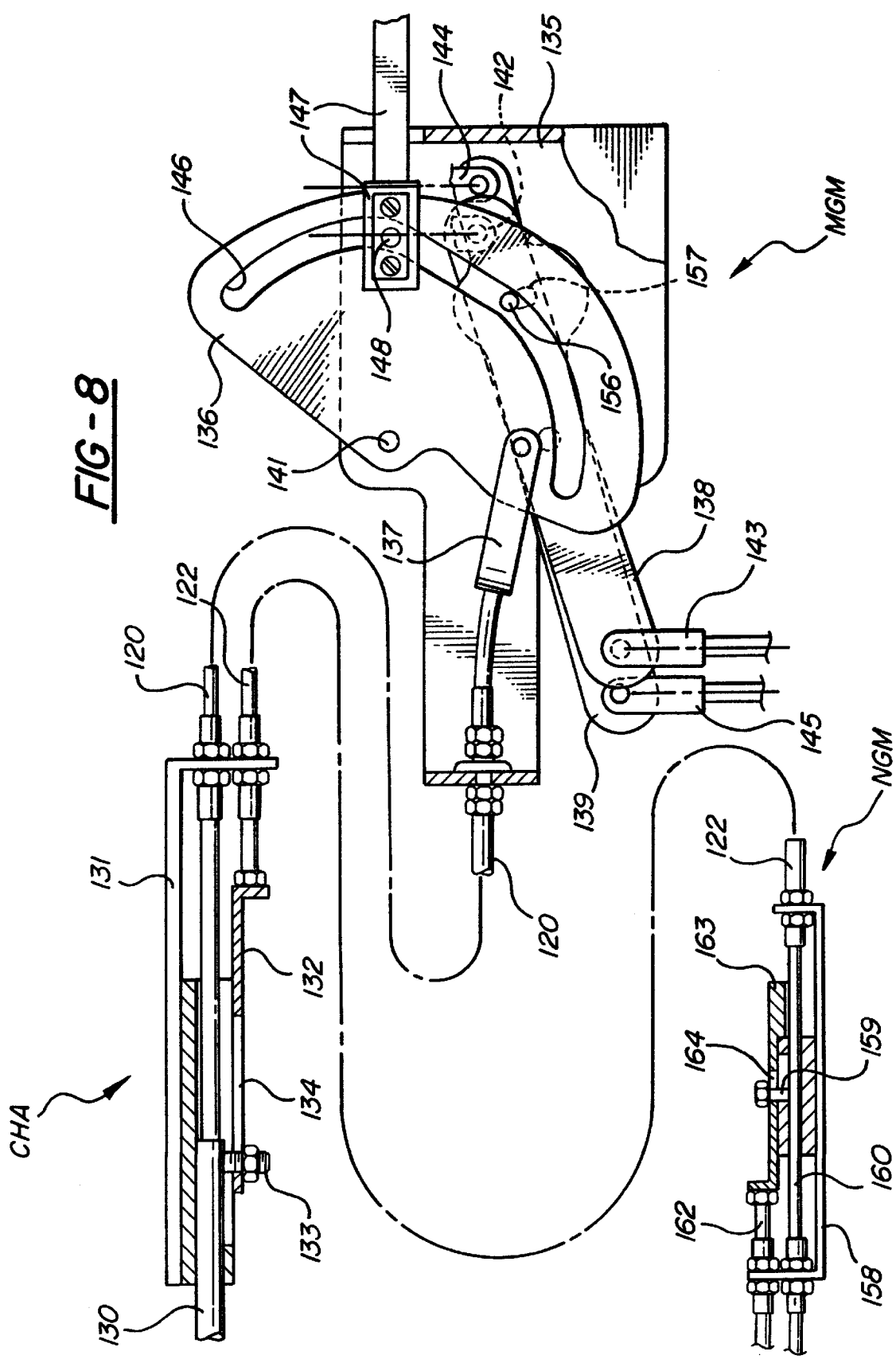

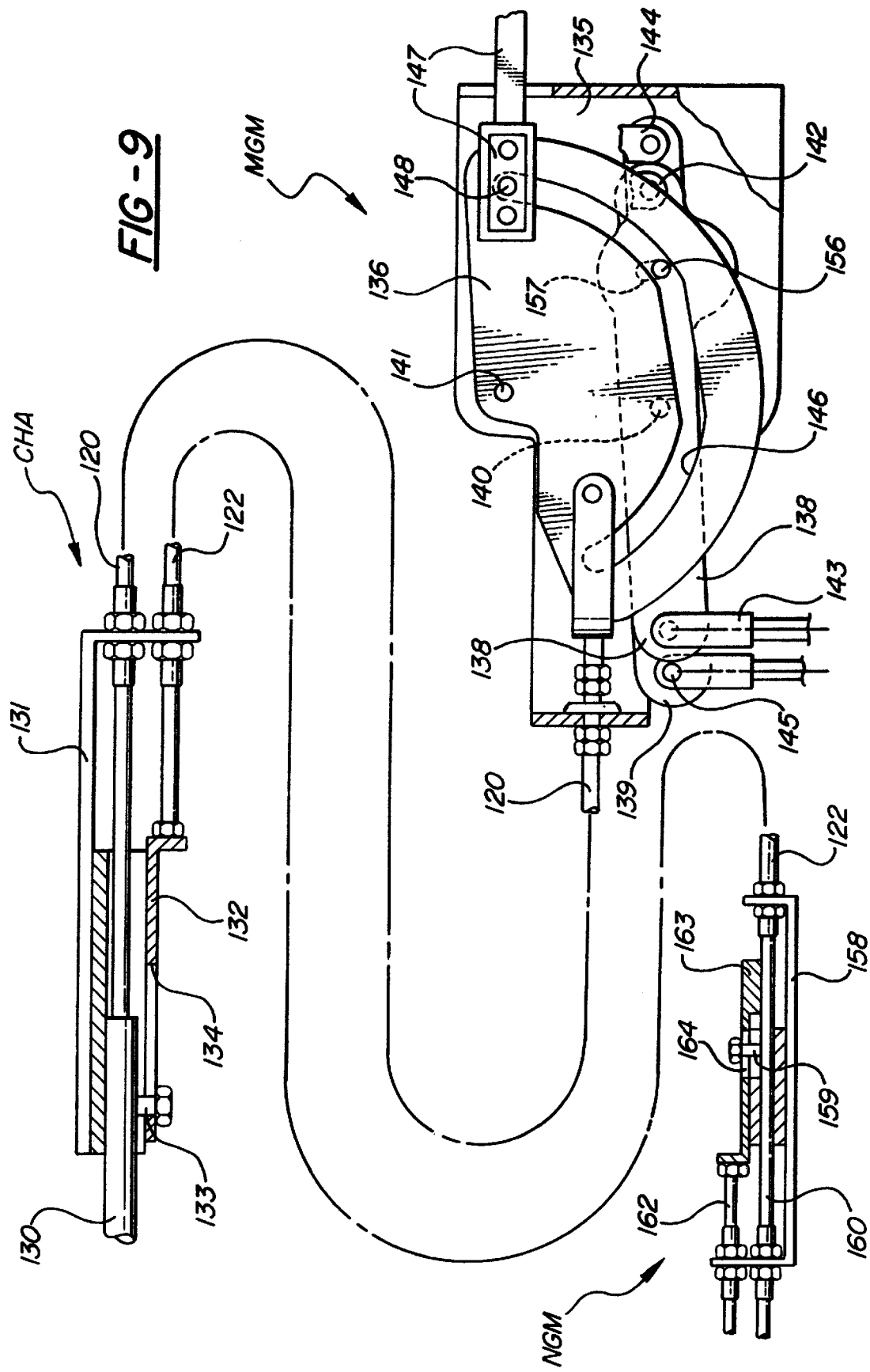

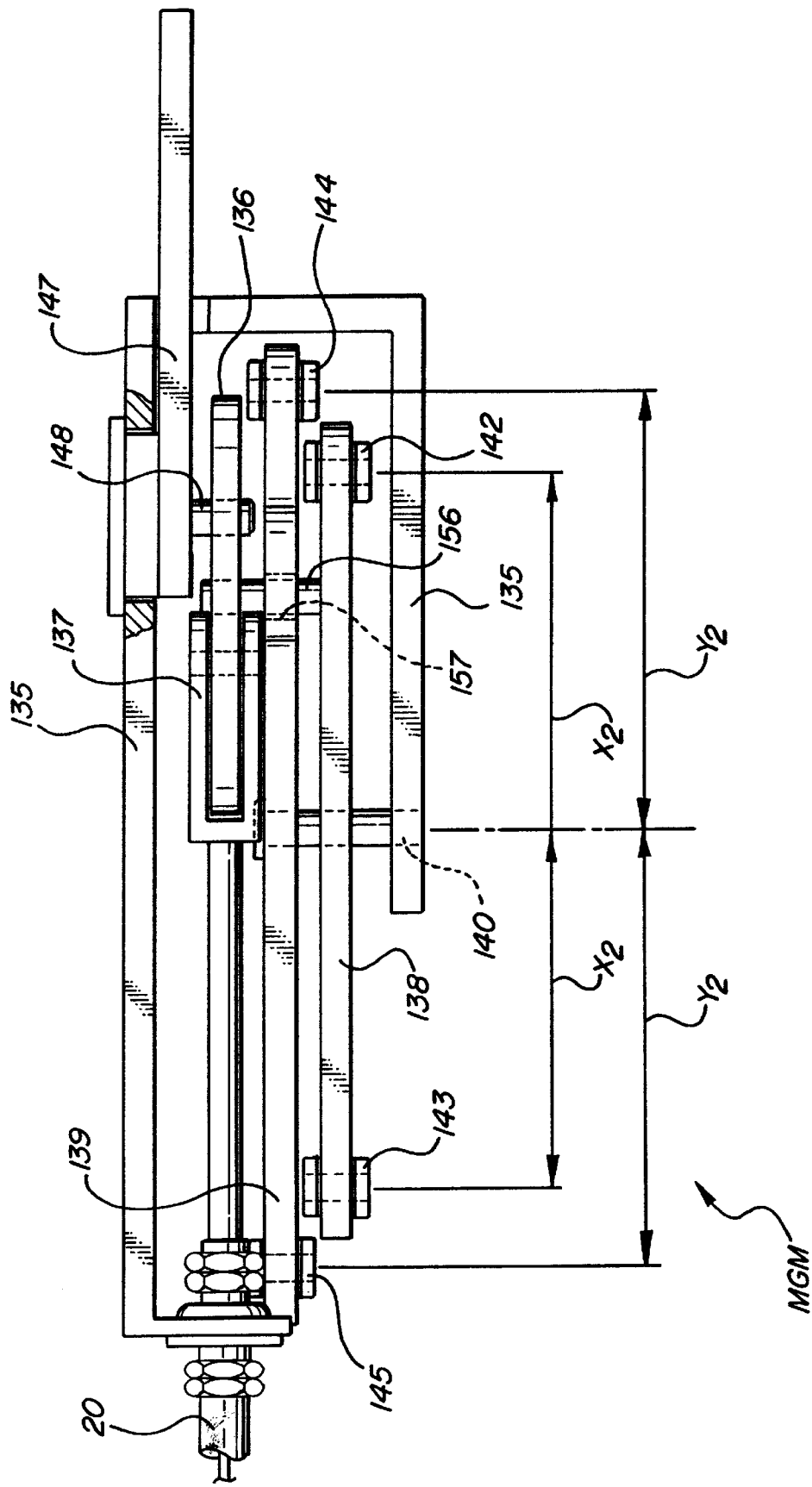

AIRCRAFT LANDING GEAR MANUAL RELEASE ASSEMBLY

TECHNICAL FIELD

The subject invention relates to the landing gear mechanism for an aircraft and, more specifically, to a single control handle assembly for releasing the uplocks which lock the doors and landing gear in the closed and retracted position, and actuating the valves which control the flow of fluid to the hydraulic gear actuating system, all in a prescribed sequence.

BACKGROUND OF THE INVENTION

In most aircraft there are at two main gear, one on either side of the fuselage, and a nose gear, all retractable. It rarely occurs that the gear actuation system fails and the landing gear must be lowered manually, i.e., bypass the normal gear actuation system, which is hydraulic. In order to lower the landing gear manually, it is necessary to release the gear uplocks which hold the gear up and locked and to release the doors which cover the gear in the up and locked position. In addition, it is often necessary to release hydraulic fluid to allow the landing gear to move to the down position.

Past systems have included complex mechanical systems with cables entrained about pulleys or cable quadrants and driven by a single control lever.

SUMMARY OF THE INVENTION AND ADVANTAGES

An aircraft landing gear manual release assembly comprises a sequential main gear mechanism for simultaneous release of port and starboard main door uplocks followed by simultaneous release of port and starboard main gear uplocks and a sequential nose gear mechanism for sequential release of a nose door uplock followed by release of a nose gear uplock. The invention is characterized by a single control handle actuator for movement from a gear stowed position to a gear deployed position for sequential actuation of the main gear mechanism followed by actuation of the nose gear mechanism.

Accordingly, the subject invention provides a system without pulleys or cable quadrants and which utilize smaller components including bushings and sliding elements. The subject invention also eliminates long open and two way cable runs and the attendant tensioning devices. The cable controls of the subject invention are sealed at the factory and eliminate the need for periodic maintenance.

BRIEF DESCRIPTION OF THE DRAWINGS

Other advantages of the present invention will be readily appreciated as the same becomes better understood by reference to the following detailed description when considered in connection with the accompanying drawings wherein:

FIG. 7 is an elevational view of a second embodiment of the subject invention;

FIG. 8 is an elevational view of the second embodiment in an intermediate position;

FIG. 9 is an elevational view of the second embodiment in a fully actuated position; and FIG. 10 is a view taken along line 10—10 of FIG. 7.

DETAILED DESCRIPTION OF THE PREFERRED EMBODIMENT

Figure 1:
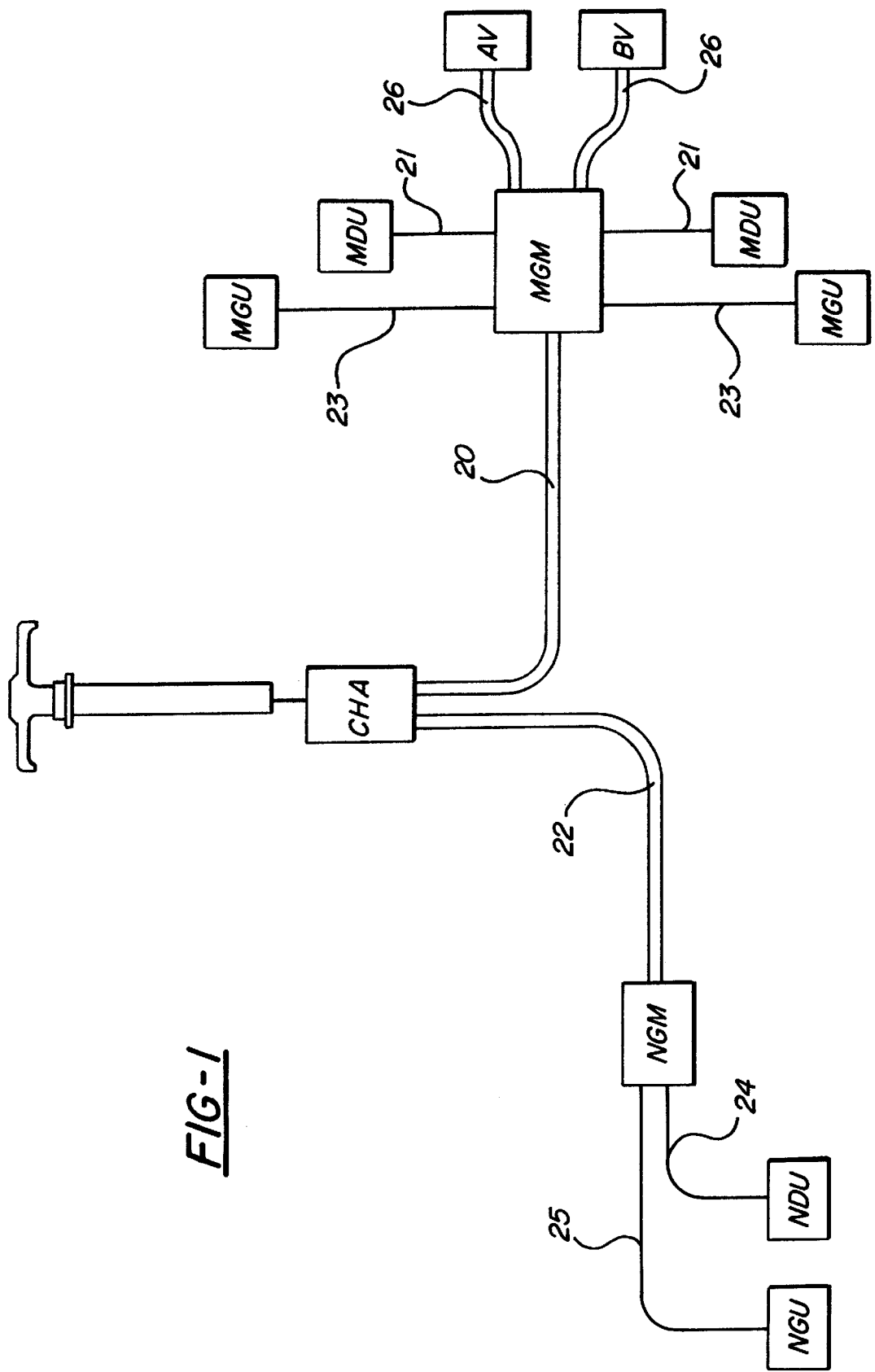
FIG. 1 is a schematic view of the subject invention.
Figure 2:
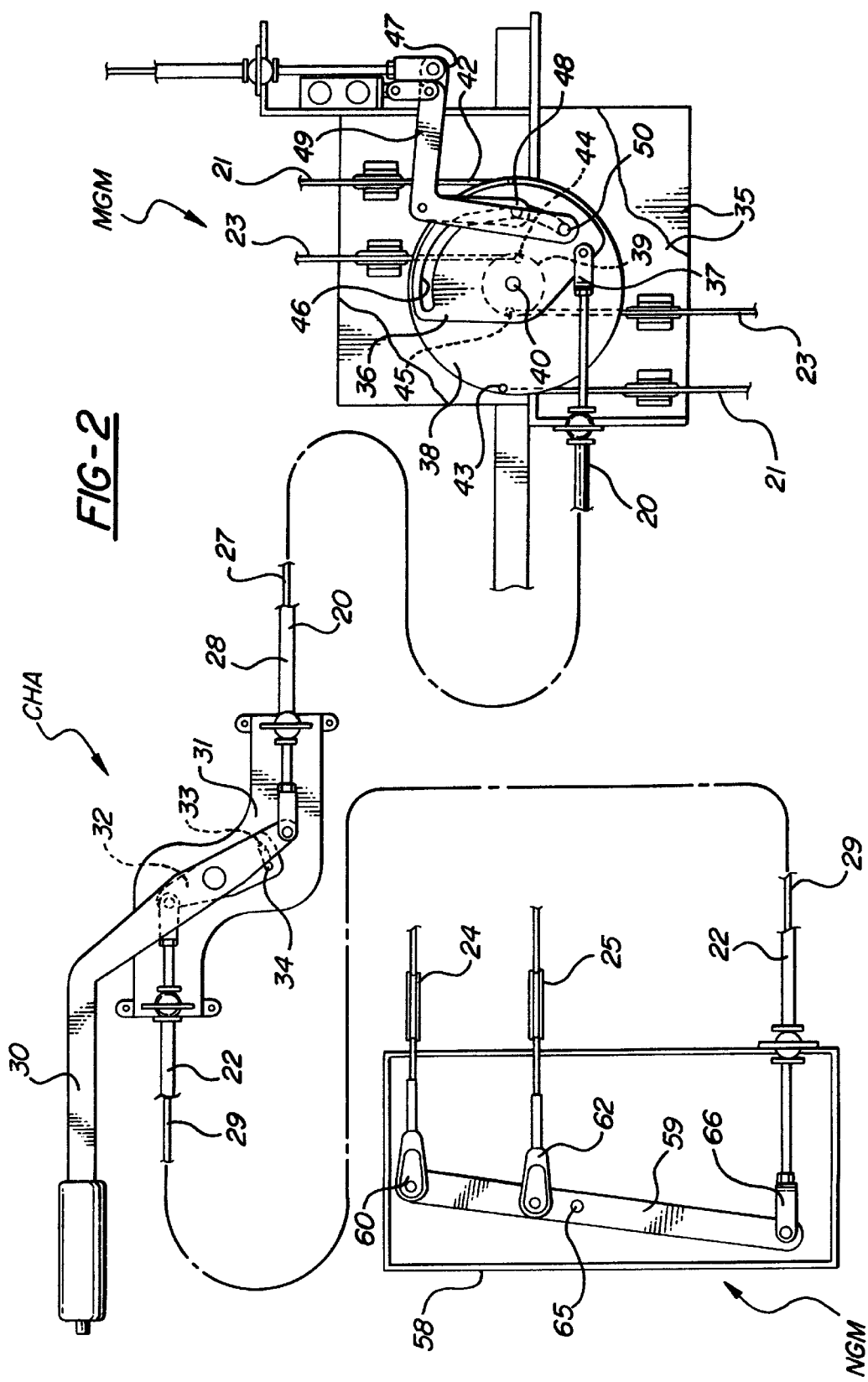
FIG. 2 is an elevational view of a first embodiment of the subject invention.
Figure 3:
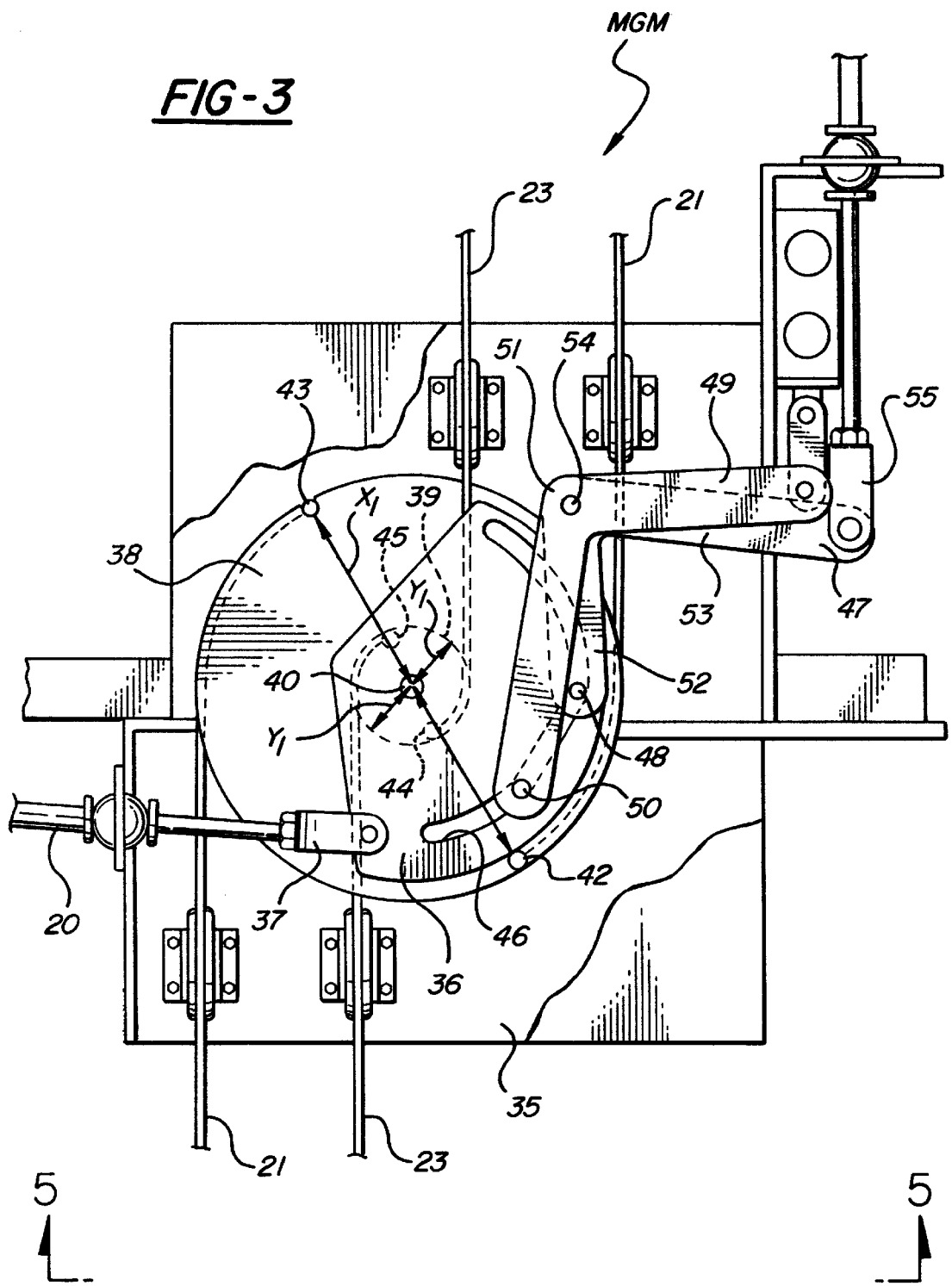
FIG. 3 is an elevational view of the main gear mechanism of the first embodiment.
Figure 4:
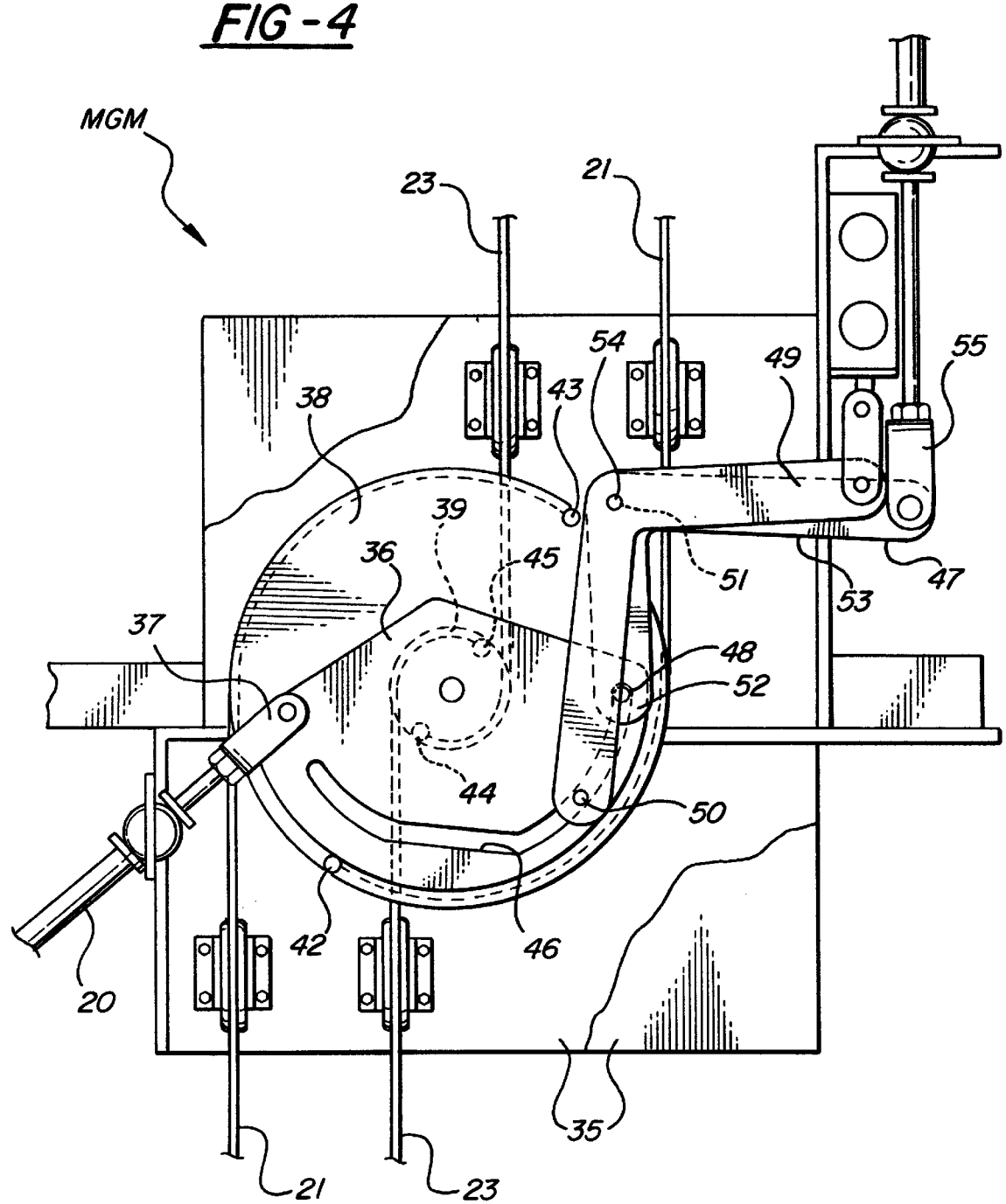
FIG. 4 is an elevational view of the main gear mechanism of the first embodiment in an actuated position.
Figure 5:
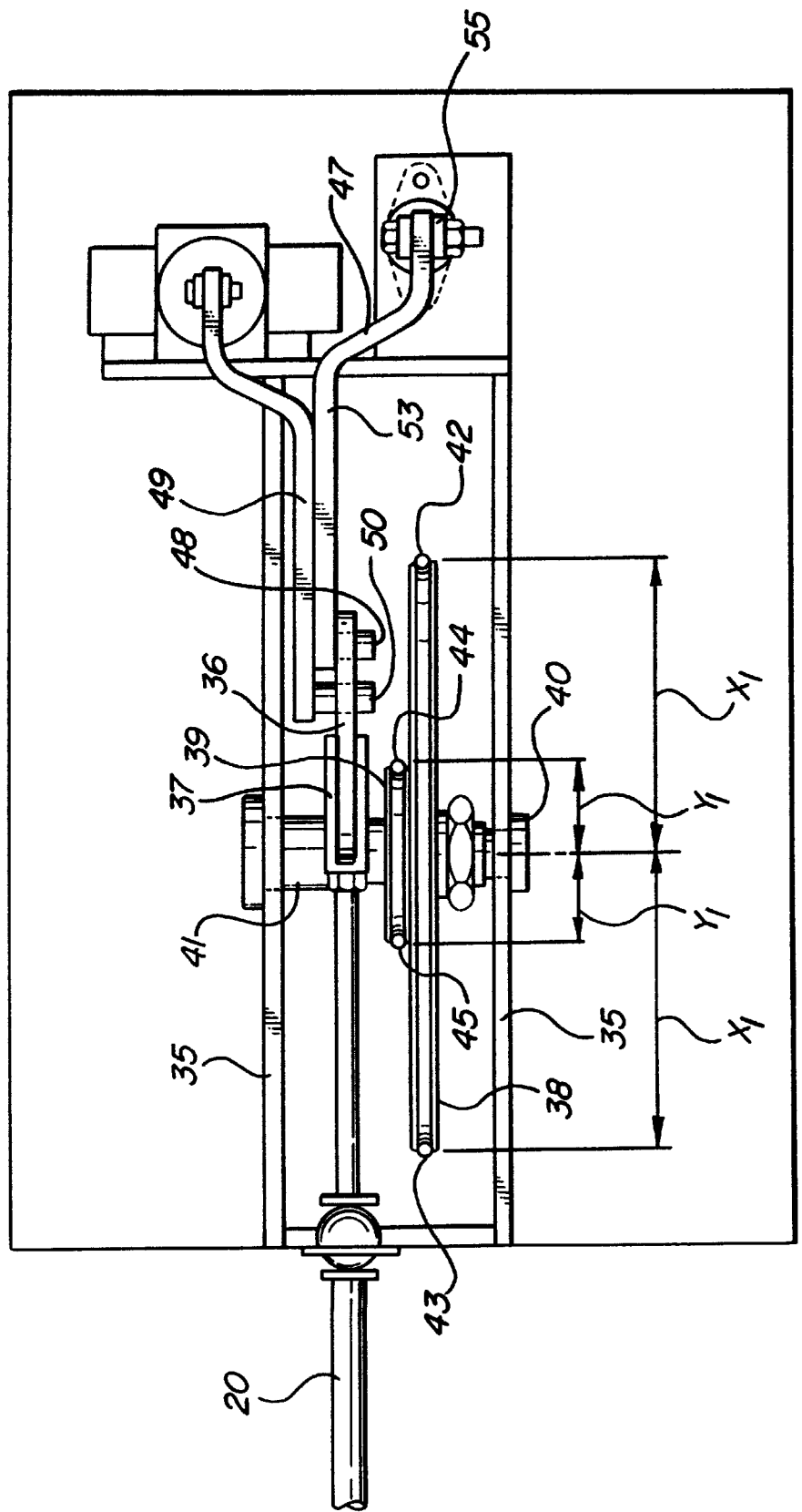
FIG. 5 is a view taken along line 5—5 of FIG. 3.
Figure 6:
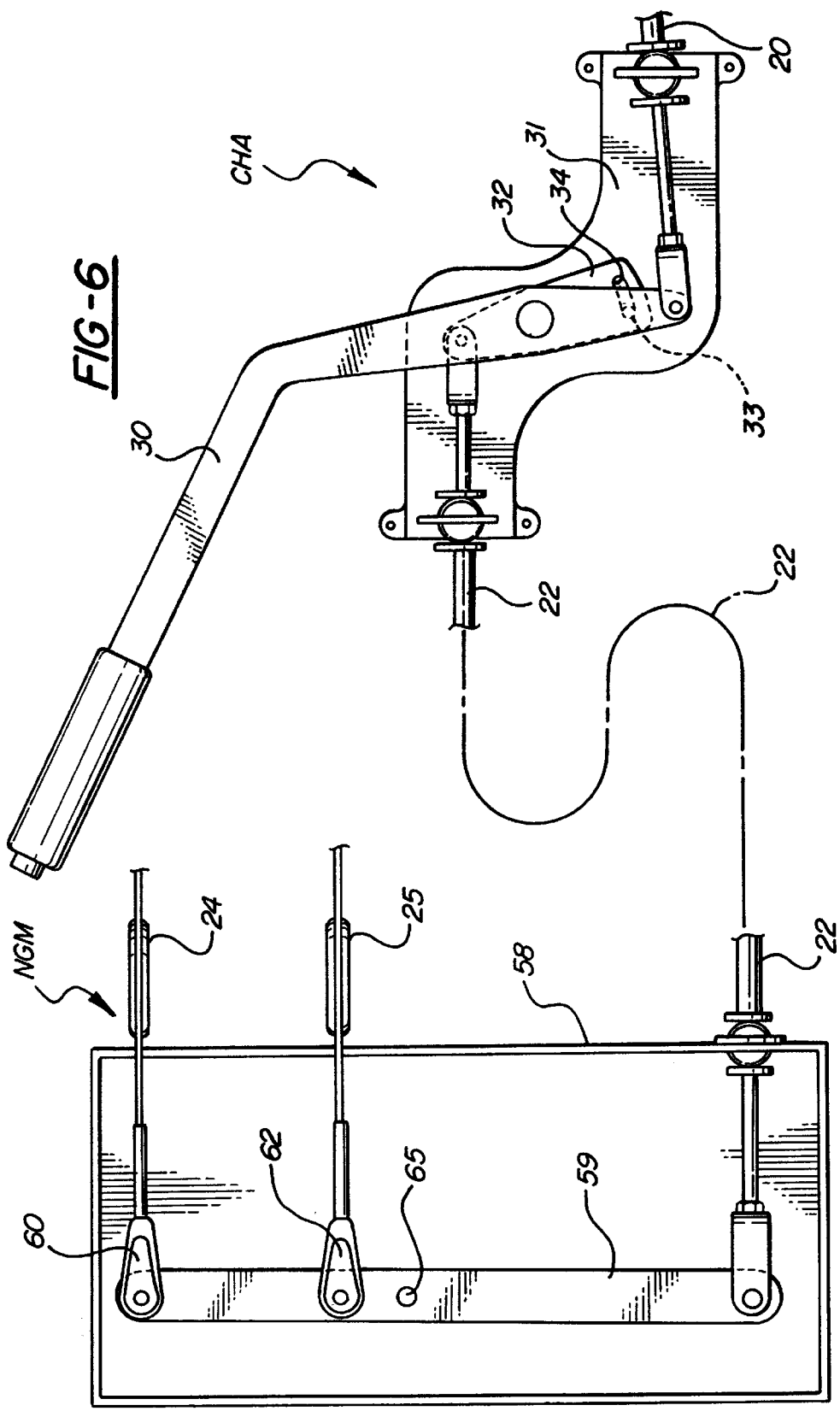
FIG. 6 is an elevational view of the nose gear mechanism of the first embodiment and a side view of the control handle actuator.

Referring to the Figures, wherein like numerals indicate like or corresponding parts throughout the several views, an aircraft landing gear manual release assembly is generally shown in FIG. 1. The assembly comprises a sequential main gear mechanism MGM for sequential release of port and starboard main door uplocks MDU followed by release of port and starboard main gear uplocks MGU and a sequential nose gear mechanism NGM for sequential release of a nose door uplock NDU followed by release of a nose gear uplock NGU. The assembly is characterized by a single control handle actuator CHA for movement from a gear stowed position to a gear deployed position with sequential actuation of the main gear mechanism MGM followed by actuation of the nose gear mechanism NGM. The main gear mechanism MGM also controls movement of hydraulic valves, AV valve and BV valve.

The single control handle actuator CHA includes a first cable assembly 20 connected to the main gear mechanism MGM and a second cable assembly 22 connected to the nose gear mechanism NGM. In addition, cable assemblies 21 interconnect the main gear mechanism MGM and the main door uplocks MDU and cable assemblies 23 interconnect the main gear mechanism MGM and the main gear uplocks MGU. Similarly, cable assemblies 24 interconnect the nose gear mechanism NGM and the nose door uplock NDU and cable assemblies 25 interconnect the nose gear mechanism NGM and the nose gear uplock NGU. Likewise, control cable assemblies or links 26 interconnect the main gear mechanism MGM and the AB and BV hydraulic valves. The cable assemblies 20 through 26 typically include a flexible motion transmitting core element movably supported in a conduit. Frequently, roller elements are disposed between the core element and the conduit for facilitating movement of the core element.

Initially both embodiments will be described generically with like parts for the second embodiment being numbered with the same numerals but increased by one hundred.

The single control handle actuator CHA includes a single control handle 30 or 130 and a first support bracket 31 or 131 movably supporting the control handle 30 or 130 and a lost motion member 32 or 132 movably supported by the first support bracket 31 or 131. As alluded to above, a first cable assembly 20 or 120 includes a first core element 27 or 127 interconnecting the control handle 30 or 130 and the main gear mechanism MGM and a first conduit 28 or 128 movably supporting the first core element 27 or 127 and a second cable assembly 22 or 122 includes a second core element 29 or 129 interconnecting the lost motion member 32 or 132 and the nose gear mechanism NGM and a second conduit surrounding and movably supporting the second core element 29 or 129. The control handle actuator CHA further includes a first lost motion connection between the control handle 30 or 130 and the lost motion member 32 or 132 whereby the control handle 30 or 130 first moves the first core element 27 or 127 and upon continued movement thereof moves the lost motion member 32 or 132 to subsequently move the second core element 29 or 129 for the sequential actuation of the main gear mechanism MGM followed by actuation of the nose gear mechanism NGM. More specifically, the first lost motion connection comprises a handle pin 33 or 133 and slot 34 or 134 combination. In the first embodiment, the control handle 30 is supported for rotational movement relative to the first support bracket 31 and the lost motion member 32 is rotatably supported on and by the first support bracket 31. The core element 27 of the first cable assembly 20 is connected to the bottom of the handle 30 below its axis of rotation and the second core element 29 is connected to the lost motion member 32. The handle pin 33 is rigidly attached to and supported by the handle 30 and slides along the slot 34 in the lost motion member 32. Accordingly, the first core element 27 moves as soon as the handle 30 is rotated and the second core element 29 moves when the handle pin 33 reaches the end of the slot 34. In the second embodiment, the control handle 130 and the lost motion member 132 are each supported for rectilinear movement relative to the first support bracket 131. The control handle 130 is connected directly to the first core element 127 whereas the second core element 129 is connected to the lost motion member 132. The lost motion member 132 contains the slot 134 and the control handle 130 supports the handle pin 133. As soon as the control handle 130 is moved rectilinearly far enough for the handle pin 133 to bottom out at the end of the slot 134, the second core element 129 will move subsequently to the initial movement of the first core element 127.

Returning to the generic description, the main gear mechanism MGM includes a support member 35 or 135 having spaced and parallel walls. A rotatable cam member 36 or 136 is rotatably supported by the support member 35 or 135 and the first core element is connected to the rotatable cam member 36 or 136 by a clevis 37 or 137.

The a sequential main gear mechanism MGM further includes a main door uplock member 38 or 138 movably supported by the support member 35 or 135 for releasing the main door uplocks MDU and a main gear uplock member 39 or 139 movably supported by the support member 35 or 135 for releasing the main gear uplocks MGU. Each of the uplock members is operably connected to the rotatable cam member 36 or 136 for moving the door uplock member 38 or 138 to a release position before moving the gear uplock member 39 or 139 to a release position to effect the sequential release of the door uplocks followed by release of the gear uplocks.

The main door uplock member 38 or 138 comprises a pulley or mechanical door lever pivotally supported by the support member 35 or 135 and operatively pivoted in response to rotation of the cam member 36 or 136 and wherein the main gear uplock member 39 or 139 comprises a pulley or mechanical gear lever pivotally supported by the support member 35 or 135 and operatively pivoted in response to rotation of the cam member 36 or 136. The mechanical levers 38 or 138 and 39 or 139 are pivotally supported co-axially by the support member 35 or 135 for rotation about a first pivot axis. In the first embodiment, the pulleys 38 and 39 are co-axially supported on an axle 40 defining the first pivot axis, and a collar 41 is rotatably disposed on the axle 40. The collar 41 is secured to both the levers 38 and 39 and the cam member 36 whereby the pulleys 38 and 39 and the cam member 36 all rotate in unison. In the second embodiment, the mechanical levers 138 and 139 are co-axially supported by a pin 140 defining the first pivot axis whereas the cam member 136 is rotatably supported by a pin 141 for rotation about a second pivot axis so that the cam member 136 is rotatably supported by the support member 135 for rotation about a second pivot axis defined by the pin 141 spaced from the first pivot axis defined by the pin 140.

Generically, one of the levers 38 or 139 extends from the first pivot axis 40 or 140 farther than the other associated lever 39 or 138, albeit reversed in so far as function attributed to the respective levers is concerned. In addition, each of the levers 38 or 138 and 39 or 139 extend in opposite directions from the first pivot axis 40 or 140. Accordingly, a starboard door connector 42 or 142 is disposed on the door lever 38 or 138 a first predetermined distance $X_1$ or $X_2$ in one direction from the first pivot axis and a port door connector 43 or 143 is disposed on the door lever the same first predetermined distance $X_1$ or $X_2$ in the opposite direction from the first pivot axis 40 or 140. In a similar fashion, a starboard gear connector 44 or 144 is disposed on the gear lever 39 or 139 a second predetermined distance $Y_1$ or $Y_2$ in one direction from the first pivot axis and a port gear connector 45 or 145 disposed on the gear lever 39 or 139 the same second predetermined distance $Y_1$ or $Y_2$ in the opposite direction from the first pivot axis 40 or 140.

Turning specifically to the first embodiment, the door lever 38 comprises a circular door pulley 38 mounted on the axle 40 via the collar 41 with the starboard door connector 42 disposed on the pulley diametrically opposite to the port door connector 43 and the gear lever comprises a circular gear pulley 39 mounted on the axle 40 via the collar 41 with the starboard gear connector 44 disposed on the pulley diametrically opposite to the port gear connector 45. The connectors 42, 43, 44 and 45 all comprise a slug, and the pulleys have grooves and pockets for receiving the slugs. Therefore, each of the cable assemblies 21 and 23 have a slug secured to a flexible cable and disposed in one of the pockets in the periphery of the pulleys. Therefore, the cables 21 and 23 move to and from as the pulleys are rotated by movement of the single control handle 30. Therefore, a flexible starboard door cable 21 extends from or forms a part of the starboard door connector slug 42 and a like flexible port door cable 21 extends from the port door connector slug 43. Similarly, a flexible starboard gear cable 23 extends from the starboard gear connector slug 44 and a flexible port gear cable 23 extends from the port gear connector slug 45.

In both embodiments, the rotatable cam member 36 or 136 includes a cam slot 46 or 146 and a first valve member 47 or 147 has a valve pin 48 or 148 disposed in the cam slot 46 or 146 whereby the valve pin 48 or 148 is moved by the cam slot 46 or 146 when the control handle 30 or 130 moves from the stowed position to the deployed position for moving the first valve member. In the second embodiment, the valve member 147 is simply supported for rectilinear movement relative to the support member 131. The first embodiment also includes a second valve member 49 supported by the support member 35 and also operatively connected to the rotatable cam member 36 by a pin 50 which is also slidable along the cam slot 46 for movement by the rotatable cam member 36. The valve member 47 comprises a bellcrank valve member having an apex 51 with first 52 and second 53 arms extending from the apex 51. The crank valve member 47 is rotatably supported in and by the support member 35 by a pivot or crank shaft 54 at the apex 51. A valve connector, e.g., a clevis 55 is disposed on the second arm 53 for actuating a hydraulic valve. The second valve member 49 operates in the same fashion as the first valve member 47 except at a different sequence. The hydraulic valves are opened to allow emergency or manual release of the gear. The valve pin 48 is supported on the first arm 52 and disposed in the cam slot 46 for rotating the crank valve member 47 upon rotation of the cam member 36 whereby the valve pin 48 is moved by the cam slot 46 when the control handle 30 moves from the stowed position to the deployed position for moving the clevis 55 rectilinearly.

As alluded to above, the levers 138 and 139 are co-axial with one another abut the pin or shaft 140 but the cam member 136 is rotatable about a separate and spaced axis 141. Therefore, a second lost motion connection is disposed between the levers 138 and 139 to sequence movement of the levers 138 and 139 one after the other. More specifically, this second lost motion connection comprises a lever pin 156 extending from the mechanical lever 138 and through a lever slot 157 in the other mechanical lever 139 and into the cam slot 146 in the cam member 136. By this arrangement, the cam slot 146 in the cam member 136 first moves the lever pin 156 to first move the door lever 138 until the lever pin 156 reaches the end of the lever slot 157 in the gear lever 139 whereupon the gear lever 139 is moved sequentially or subsequently to the movement of the door lever 138.

Turning to a generic description of the nose gear mechanism NGM, it includes a second support bracket 58 or 158 and a transfer member 59 or 159 movably supported by the second support bracket 58 or 158. The second core element 29 or 129 is connected to the transfer member 59 or 159. The nose gear mechanism NGM includes a nose door uplock member 60 or 160 connected to the transfer member 59 or 159 and a nose gear uplock member 62 or 162 connected to the transfer member 59 or 159. In the first embodiment, the transfer member 59 is an elongated transfer lever rotatably connected by a shaft 65 to the second support bracket 58 for rotation about a transfer axis defined by the shaft 65. The second core element 29 is connected to the transfer lever 59 by a clevis 66 on one side of the transfer axis defined by the shaft 65. The uplock members 60 and 62 are connected by the clevis 66 to the transfer lever 59 on the other side of the shaft 65. The uplock members 60 and 62 are connected to the transfer lever 59 at different distances from the transfer axis whereby the arcs are different so that the movements are sequenced. In the second embodiment, the transfer member is a bolt 159 connected to or supported on the second support bracket 158 for rectilinear movement and the second core element 129 is connected to the transfer member 159. The nose gear uplock member 162 includes a slider member 163 supported by the transfer member 159 by a third lost motion connection, which includes a slider slot 164 in the slider member 163 through which the bolt 159 defining the transfer member. One 160 of the uplock members is connected directly to the bolt transfer member 159 and the other 162 uplock member is connected to the slider member 163. Accordingly, upon movement of the second core element 129, the nose door uplock member 160 is first moved followed by movement of the gear uplock member 162 after the bolt 159 bottoms out along the slider slot 164.

As will be appreciated, the control handle actuator CHA of the first embodiment may be substituted for the control handle actuator CHA of the second embodiment, and vice versa. Summarily, the nose gear mechanisms NGM of the respective embodiments may be substituted for one another.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An aircraft landing gear manual release assembly port and starboard main door uplocks OMU), port and starboard main gear uplocks (MGU), a nose door uplock (NDU) and a nose gear uplock (NGU), said assembly comprising:

a sequential main gear mechanism (MGM) for sequential release of the port and starboard main door uplocks (MDU) followed by release of the port and starboard main gear uplocks (MGU);

a sequential nose gear mechanism (NGM) for sequential release of the nose door uplock (NDU) followed by release of the nose gear uplock (NGU); and characterized by a single control handle actuator (CHA) for movement from a gear stowed position to a gear deployed position for sequential actuation of said main gear mechanism (GM) followed by actuation of said nose gear mechanism (NGM).

2. An assembly as set forth in claim 1 wherein said single control handle actuator (CHA) includes a first cable assembly (20 or 120) connected to said main gear mechanism (MGM) and a second cable assembly (22 or 122) connected to said nose gear mechanism (NGM).

3. An assembly as set forth in claim 2 wherein said single control handle actuator (CHA) includes a single control handle (30 or 130) and a first support bracket (31 or 131) movably supporting said control handle (30 or 130) and a lost motion member (32 or 132) movably supported by said first support bracket (31 or 131), and wherein said first cable assembly (20 or 120) includes a first core element (27 or 127) interconnecting said control handle (30 or 130) and said main gear mechanism (GM) and a first conduit (28 or 128) movably supporting said first core element (27 or 127), and wherein said second cable assembly (22 or 122) includes a second core element (29 or 129) interconnecting said lost motion member (32 or 132) and said nose gear mechanism (NGM) and a second conduit movably supporting said second core element (29 or 129), and said control handle actuator (CHA) further includes a first lost motion connection (33 and 34 or 133 and 134) between said control handle (30 or 130) and said lost motion member (32 or 132) whereby said control handle (30 or 130) first moves said first core element (27 or 127) and upon continued movement thereof moves said lost motion member (32 or 132) to subsequently move said second core element (29 or 129) for said sequential actuation of said main gear mechanism (MGM) followed by actuation of said nose gear mechanism (NGM).

4. An assembly as set forth in claim 3 wherein said main gear mechanism (MGM) includes a support member (35 or 135), a rotatable cam member (36 or 136) rotatably supported by said support member (35 or 135), said first core element (27 or 127) being connected to said rotatable cam member (36 or 136).

5. An assembly as set forth in claim 4 wherein said a sequential main gear mechanism (MGM) further includes a main door uplock member (38 or 138) movably supported by said support member (35 or 135) for releasing the main door uplocks (MDU) and a main gear uplock member (39 or 139) movably supported by said support member (35 or 135) for releasing the main gear uplocks (MGU), each of said uplock members being operably connected to said rotatable cam member (36 or 136) for moving said door uplock member (38 or 138 and 39 or 139) to a release position before moving said gear uplock member to a release position to effect said sequential release of the door uplocks followed by release of the gear uplocks.

6. An assembly as set forth in claim 5 wherein said rotatable cam member (36 or 136) includes a cam slot (46 or 146), and including a first valve member (47 or 147) having a valve pin (48 or 148) disposed in said cam slot (46 or 146) whereby said valve pin (48 or 148) is moved by said cam slot (46 or 146) when said control handle (30 or 130) moves from said stowed position to said deployed position for moving said first valve member (47 or 147).

7. An assembly as set forth in claim 6 wherein said valve member (147) is supported for rectilinear movement relative to said support member (135).

8. An assembly as set forth in claim 6 wherein said valve member (47) is supported for rotational movement by said support member (35).

9. An assembly as set forth in claim 5 wherein said main door uplock member (38 or 138) comprises a mechanical door lever pivotally supported by said support member (35 or 135) and operatively pivoted in response to rotation of said cam member (36 or 136) and wherein said main gear uplock member (39 or 139) comprises a mechanical gear lever pivotally supported by said support member (35 or 135) and operatively pivoted in response to rotation of said cam member (36 or 136).

10. An assembly as set forth in claim 9 wherein said levers (38, 39, 138 and 139) are pivotally supported co-axially by said support member (35 or 135) for rotation about a first pivot axis (40 or 140).

11. An assembly as set forth in claim 10 wherein one of said levers (38 and 139) extends farther from said first pivot axis (40 or 140) than the other lever (39 and 138).

12. An assembly as set forth in claim 10 wherein each of said levers (38, 39, 138 and 139) extend in opposite directions from said first pivot axis (40 or 140), and including a starboard door connector (42 or 142) disposed on said door lever (38 or 138) a first predetermined distance ($X_1$ or $X_2$) in one direction from said first pivot axis (40 or 140) and a port door connector (43 or 143) disposed on said door lever (38 or 138) said first predetermined distance ($X_1$ or $X_2$) in the opposite direction from said first pivot axis (40 or 140), a starboard gear connector (44 or 144) disposed on said gear lever (39 or 139) a second predetermined distance ($Y_1$ or $Y_2$) in one direction from said first pivot axis (40 or 40) and a port gear connector (45 or 145) disposed on said gear lever (39 or 39) said second predetermined distance ($Y_1$ or $Y_2$) in the opposite direction from said first pivot axis (40 or 40).

13. An assembly as set forth in claim 12 wherein said first pivot axis (40) is defined by an axle (41) supported by said support member (35), said cam member (36) supported on said axle (41) for rotation relative to said support member (35), and wherein said door lever (38) comprises a door pulley having a peripheral groove and mounted on said axle (41) with said starboard door connector (42) disposed on said pulley diametrically opposite to said port door connector (43), and wherein said gear lever (39) comprises a gear pulley having a peripheral groove and mounted on said axle (41) with said starboard gear connector (44) disposed on said pulley diametrically opposite to said port gear connector (45).

14. An assembly as set forth in claim 13 including a flexible starboard door cable (21) extending from said starboard door connector (42), a flexible port door cable (21) extending from said port door connector (43), a flexible starboard gear cable (23) extending from said starboard gear connector (44), and a flexible port gear cable (23) extending from said port gear connector (45).

15. An assembly as set forth in claim 13 wherein said rotatable cam member (36) includes a cam slot (46), and including a crank valve member (47) having an apex (51) with first (52) and second (53) arms extending form said apex (51), said crank valve member (47) being rotatably supported by said support member (35) at said apex (51), a valve connector (55) disposed on said second arm (53) for actuating a valve, a valve pin (48) supported on said first arm (52) and disposed in said cam slot (46) for rotating said crank valve member (47) upon rotation of said cam member (36) whereby said valve pin (48) is moved by said cam slot (46) when said control handle (30) moves from said stowed position to said deployed position for moving said valve connector (55).

16. An assembly as set forth in claim 12 wherein the cam member (136) is rotatably supported by the support member for rotation about a second pivot axis (141) spaced from the first pivot axis (140).

17. An assembly as set forth in claim 16 including a second lost motion connection (156) between said levers (138 and 139).

18. An assembly as set forth in claim 16 including a second lost motion connection (156) between said cam member (136) and said levers (138 and 139) to sequence movement of said levers (138 and 139) one after the other.

19. An assembly as set forth in claim 12 wherein said nose gear mechanism (NGM) includes a second support bracket (58 or 158) and a transfer member (59 or 159) movably supported by said second support bracket (58 or 158), said second core element (29 or 129) being connected to said transfer member (59 or 159).

20. An assembly as set forth in claim 19 wherein said nose gear mechanism (NGM) includes a nose door uplock member (60 or 160) connected to said transfer member (59 or 159) and a nose gear uplock member (62 or 162) connected to said transfer member (59 or 159).

21. An assembly as set forth in claim 20 wherein said transfer member is a transfer lever (59) rotatably connected to said second support bracket (58) for rotation about a transfer axis (65), said second core element (29 or 129) connected (66) to said transfer lever (59) on one side of said transfer axis (65) and said uplock members (60 and 62) connected to said transfer lever (59) on the other side of said transfer axis (65).

22. An assembly as set forth in claim 21 wherein said uplock members (60 and 62) are connected to said transfer lever (59) at different distances from said transfer axis (65).

23. An assembly as set forth in claim 20 wherein said transfer member (159) is connected to said second support bracket (158) for rectilinear movement, said second core element (129) being connected to said transfer member (159), a slider member (163) moved by said transfer member (159) through a third lost motion connection (164), one of said uplock members (160) connected to said transfer member (159) and the other uplock member (162) connected to said slider member (163).

24. An assembly as set forth in claim 12 wherein first lost motion connection comprises a pin (33 or 133) and slot (34 or 134) combination.

* * * * *